Dec. 21, 1954   R. M. NALVEN   2,697,421
CONTROL FOR WASTE HEAT BOILERS
Filed Aug. 2, 1952   3 Sheets-Sheet 1
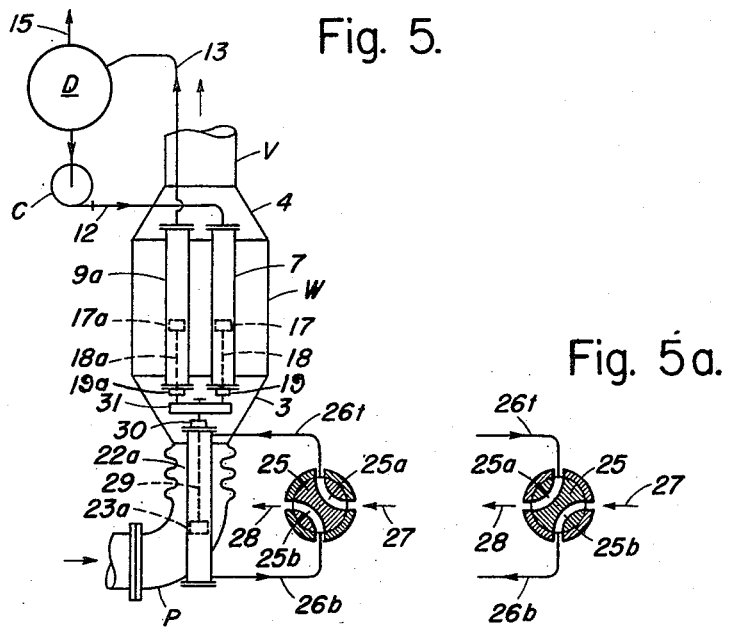
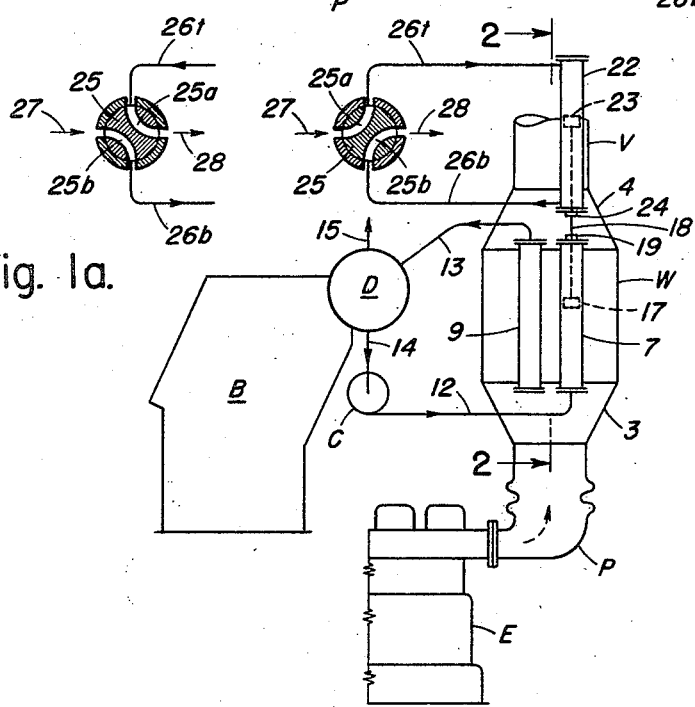
INVENTOR
Robert M. Nalven
BY
C. F. Bryant
ATTORNEY Dec. 21, 1954   R. M. NALVEN   2,697,421
CONTROL FOR WASTE HEAT BOILERS
Filed Aug. 2, 1952   3 Sheets-Sheet 2

Gas Flow

INVENTOR
Robert M. Nalven
BY
*R. F. Bryant*
ATTORNEY

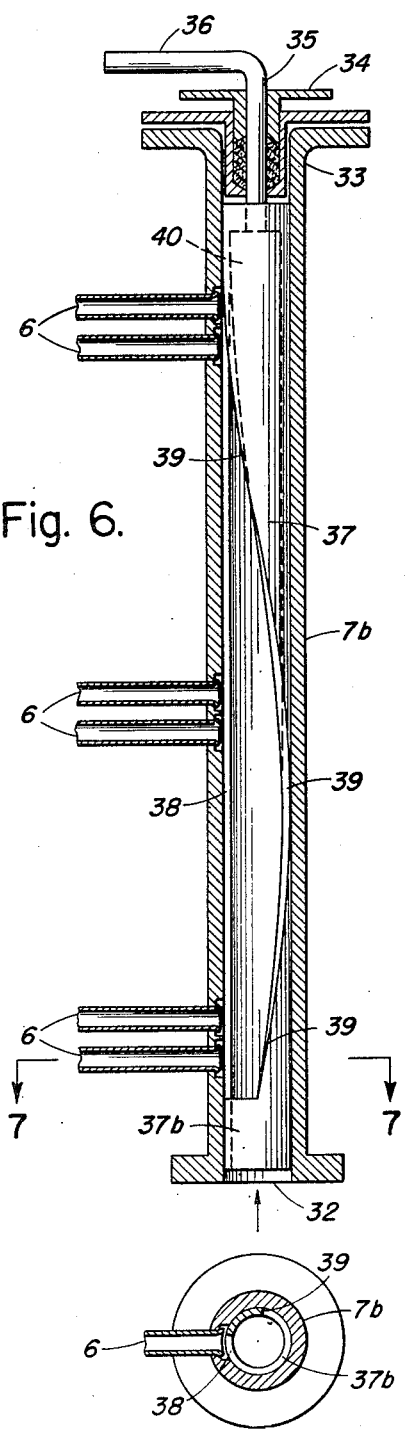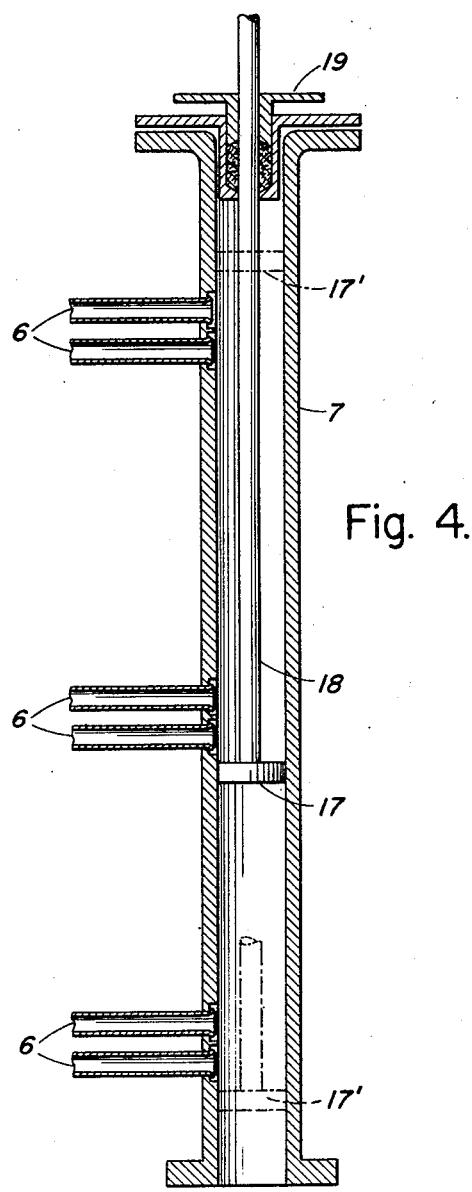

United States Patent Office 2,697,421
Patented Dec. 21, 1954

2,697,421

CONTROL FOR WASTE HEAT BOILERS

Robert M. Nalven, Flushing, N. Y., assignor to Combustion Engineering, Inc., New York, N. Y., a corporation of Delaware Application August 2, 1952, Serial No. 302,435

1 Claim. (Cl. 122—7)

This invention relates generally to fluid heat exchange apparatus in which the heat contained within hot waste gases is utilized and is particularly concerned with such a heat exchanger having a control for the output thereof which control is independent of the amount and temperature of the hot waste gases.

The invention is herein illustratively disclosed as including a water tube waste heat steam boiler receiving its heat from the exhaust gases of an internal combustion engine. In such an installation the variation in the quantity and temperature of the exhaust gases from said engine bears no relation to the requirements of steam output of the waste heat boiler wherefore in order to control the steam output a specific control means must be provided.

The primary object of the invention is to provide means to regulate the steam output of a waste heat boiler independently of the quantity and temperature of exhaust gases supplied to the boiler.

Other objects of the invention will become apparent and be brought out more fully in the following description considered with reference to the accompanying drawings, wherein:

Fig. 1 is a schematic view of a waste heat boiler embodying the invention and shown as receiving exhaust gases from an internal combustion engine.

Fig. 1a is a detail view of the motor contol valve of Fig. 1 shown as occupying its other control position;

Fig. 4 is a sectional view to an enlarged scale taken on line 4—4 of Fig. 3 showing the details of the inlet header and control valve;

Figs. 5 and 5a are views similar to Figs. 1 and 1a, respectively, showing a modification of the invention;

Fig. 6 is a view similar to Fig. 4 showing another form of regulating valve;

Fig. 7 is a cross section taken on line 7—7 of Fig. 6.

Figure 3:
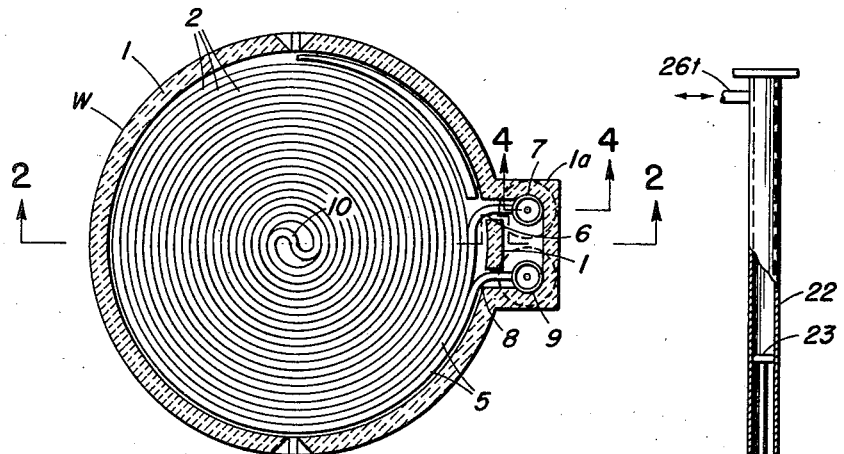
Fig. 3 is a cross section of the waste heat boiler taken on line 3—3 of Fig. 2.

Referring to Fig. 1, the general arrangement of the apparatus herein disclosed for recovering heat from so-called waste gases and particularly the exhaust gases of an internal combustion engine (designated in the drawing as E) includes a waste heat boiler W, a steam and water separating drum D, which may be the drum of an auxiliary boiler B, and a water circulation pump C. Exhaust pipe P of engine E conveys the hot exhaust gases into the waste heat boiler W wherein the gases give up a portion of the heat contained therein to the heat exchange tubes located in said boiler and thereafter pass upwardly through vent V.

Figure 2:
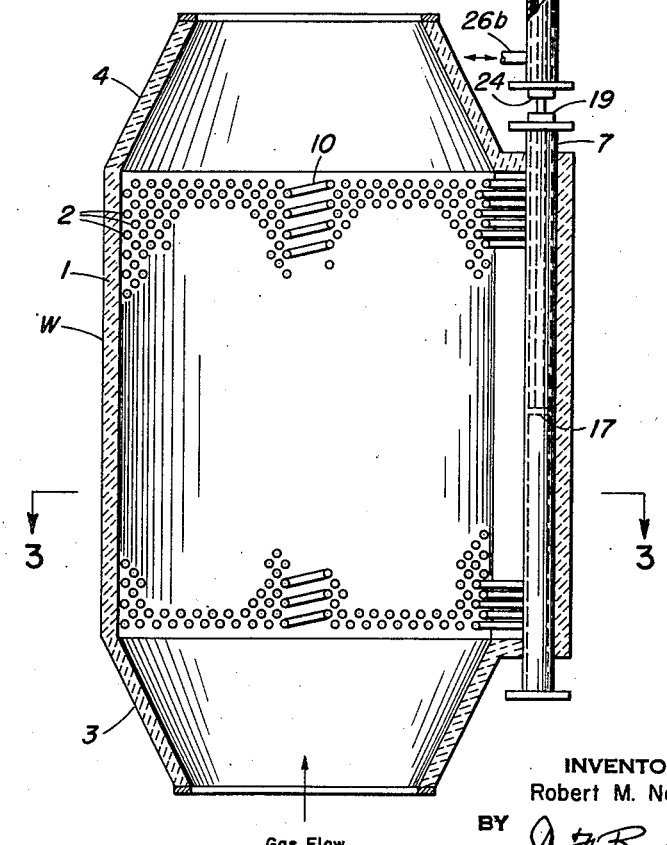
Fig. 2 is a sectional view taken generally along line 2—2 of Figs. 1 and 3 showing the internal construction of the waste heat boiler.

Waste heat boiler W as shown in Figs. 2 and 3, comprises a casing 1 enclosing a multiplicity of pipe coils 2 arranged in parallel spaced-apart planes transverse to the direction of gas flow through the casing. The gas inlet and outlet ends of the casing 1 are provided with reducers 3 and 4, respectively, to which exhaust pipe P and vent pipe V are respectively connected (Fig. 1).

Each of the pipe coils 2 comprises a single continuous tube 5 connected at its inlet end 6 (Fig. 3) to an inlet header 7 and at its outlet end 8 to an outlet header 9.

Tube 5 is preferably wound around the vertical axis of the boiler casing in a manner forming two intermeshing spirals, one spiral beginning at its inlet end 6 and contracting in a clockwise direction toward said axis to one end of an S-shaped reverse bend 10 and the other spiral beginning at the other end of said reverse bend 10 and expanding in a counter clockwise direction to its outlet end 8. The tubes of these two spirals are slightly offset longitudinally of said axis with the tubes of one being out of axial alignment with the tubes of the other as shown in Fig. 2.

Inlet header 7 and outlet header 9 are positioned externally of casing 1 extending generally parallel with the longitudinal axis thereof and being connected with tube ends 6 and 8, respectively, through suitable openings provided in said casing. Housing 1a surrounds said headers and is secured to casing 1 in any desired manner.

In the organization of Fig. 1 inlet header 7 is connected by pipe 12 to the outlet of circulation pump C, outlet header 9 is connected by pipe 13 to steam and water separating drum D, and the lower portion of said drum D is connected by pipe 14 to the inlet of said pump C thereby completing a circuit through which said pump C is effective to circulate the boiler water as indicated by the arrows.

In operation of said organization of Fig. 1 hot exhaust gases from engine E collect in exhaust pipe P and from there pass through waste heat boiler W and out vent V. Water from the drum D is delivered to the inlet header 7 by circulation pump C through pipe 12 and from said header flows in parallel streams through each of the pipe coils 2 to the outlet header 9 and thence through pipe 13 into drum D. While flowing through coils 2, the cool water absorbs heat from the hot exhaust gases flowing over the coils and a portion of said water is evaporated into steam. In drum D the steam is separated from the remaining water and flows out of said drum through offtake 15 to a point of use.

The number of pipe coils 2 or the total heating surface of the waste heat boiler W is determined by the maximum amount of steam desired and the volume and temperature of the exhaust gases passing through the generator.

In the case of an internal combustion engine the gases supplied will be substantially constant in amount and temperature at a given engine load and thus under said given load condition the boiler will generate a corresponding substantially constant amount of steam. However, the amount of steam that is both necessary and desirable varies within wide limits often being considerably less than the maximum output of the generator. In boiler operation in general it is extremely desirable to conserve the rather expensive boiler make up water and in marine operation it is absolutely essential that this water not be wasted. It is thus necessary to regulate the output of the steam generator in accordance with the demand. Obviously this may be accomplished by making provisions to reduce the gas flow through the boiler by means of deflecting some of the gases before they enter the boiler, such as by by-passing them around the boiler from pipe P to pipe V. However, by-passing the gases in this manner involves bulky duct work and tends to defeat the compactness of design of the type of waste heat boiler hereinbefore described.

In accordance with one form of the invention the output of the generator is regulated by a piston type valve 17 (Figs. 1 and 4) positioned in the inlet header 7 in slidable but substantially fluid tight engagement with the inner surface thereof and movable therewithin from one end to the other as shown by the dashed and dotted positions 17' (Fig. 4).

Rod or valve stem 18 is fastened to the piston 17 to move the same back and forth and passes through a stuffing box 19 in one end of the header 7. The end of header 7 opposite the stuffing box 19 receives the discharge from pump C and thus piston valve 17 serves as a barrier to prevent water which enters said header from conduit 12 from entering those coil inlet ends 6 which lie beyond the piston 17 with respect to said end receiving said discharge. In this manner the number of coils 2 receiving boiler water may be increased or decreased by respectively increasing or decreasing the distance of the piston 17 from the water inlet of header 7.

Any conventional valve actuating means may be employed to motivate piston valve 17 with one such preferred means being shown in the drawing and including a cylinder 22 having a piston 23 slidably positioned therewithin with rod 18 secured thereto and extending to the exterior of said cylinder through stuffing box 24. The supply of pressure to and exhaust of pressure from each end of cylinder 22 causes piston 23 to move therewithin and this supply and exhaust of pressure is controlled by rotary plug valve 25 having passages 25a and 25b therein. Said valve 25 is connected to the top and bottom ends of cylinder 22 by pipes 26t and 26b, respectively, and is connected to fluid inlet and relief pipes 27 and 28, respectively, as shown.

In the position shown in Fig. 1, the valve directs fluid under pressure from pipe 27, through passage 25a and pipe 26t into the cylinder 22 above piston 23. Simultaneously fluid below piston 23 is released through pipe 26b, valve passage 25b and relief pipe 28. Consequently the piston 23 is forced downwardly within cylinder 22 resulting in a downward movement of piston 17 in header 7.

Fig. 1a shows the valve 25 rotated clockwise through 90 degrees relative to its position in Fig. 1 and by following the arrows it will be seen that fluid pressure from pipe 27 is directed through passage 25b, pipe 26b into cylinder 22 against the bottom of piston 23, while the fluid on top of the piston is released by flowing through pipe 26t, passage 25a and relief pipe 28. Piston 23 is thereby forced upwardly and with it piston valve 17 in header 7.

If desirable, as shown in the embodiment of Fig. 5, the outlet header 9a may be equipped with piston valve 17a and rod 18a similar to the piston valve 17 and rod 18 shown and described for inlet header 7 in the organization of Fig. 1. However, in this embodiment, in order that the piston valve for both headers may be simultaneously moved equal distances in their respective headers rods 18 and 18a extend through the lower end of said respective headers passing through suitable stuffing boxes 19 and 19a. Header 7 is thus inverted from its position in the organization of Fig. 1, with pipe 12, connecting the outlet of pump C with said header 7, communicating with the top thereof. Outlet header 9a is connected to drum D in a manner similar to the organization of Fig. 1 with pipe 13 communicating with the top of said header. Thus by simultaneous movement of pistons 17 and 17a within their respective headers the number of pipe coils 2 through which the boiler water is circulated can be regulated thereby controlling the output of the boiler.

The driving means for rods 18 and 18a shown in Figs. 5 and 5a is similar to that described above and shown in Figs. 1 and 1a. A single cylinder 22a is provided with a piston 23a fastened to a piston rod 29. Rod 29 passes through stuffing box 30 and fastens to a cross head 31 which in turn fastens to said valve rods 18 and 18a. The piston 23a and therewith the piston valves 17 and 17a are moved back and forth by manipulation of the valve 25 in the same manner as described above with respect to the control of the movement of piston 23 in cylinder 22 of Figs. 1 and 1a.

Figs. 6 and 7 show another type of valve positionable in one or both of the headers for controlling the number of pipe coils 2 that are effectively in the boiler circulating system. Referring specifically to these figures inlet header 7b communicates with discharge pipe 12 of circulation pump C through inlet opening 32 and inlet 6 of coils 2 are connected into the side of the header 7b preferably in longitudinal alignment as shown. At the header's end 33, opposite the inlet 32, is provided a stuffing box 34 through which a valve rod 35 projects axially into the header 7b, said rod being provided with an arm 36 for rotating the same. Fitted into header 7b is an incomplete hollow cylinder or valve 37, the end of which, below the lowermost coil ends 6, is formed as a complete hollow cylinder 37b which serves to keep the valve centered within the header. One edge 38 of the incomplete cylinder 37 extends parallel to the axis of header 7b while the other edge 39 lies in a helix extending longitudinally around said axis as shown. The upper end of valve 37 is effectively closed by a solid cylindrical portion 40 which is connected to the inner end of valve rod 35.

In the position shown in Figs. 6 and 7 all of the coil ends 6 are uncovered by valve 37 and thus all will receive any fluid entering through the inlet and hollow cylinder 37b. Upon rotating valve 37 in the clockwise direction, as viewed in Fig. 7, communication between the uppermost coil ends 6 and the interior of header 7b will first be interrupted with this interruption progressing longitudinally of said header upon continued rotation of said valve until at its extreme position said valve is effective to isolate all of the pipe coils 2 from communication with header 7b.

While the only means disclosed for operating valve 37 is handle 36 it is obvious that any conventional type of motor operator may be employed for this purpose.

The various means described above for shutting off a selected number of coils 2 from receiving boiler water provides a novel and simple means for reducing the number of coils participating in evaporating water thereby reducing the steam output of the steam generator. Because the waste gases chosen for use in this type of steam generator have relatively low temperatures upon entering the generator, the tubes 5 of coils 2 are not injured by overheating upon stopping the circulation of boiler water therethrough.

While I have shown and described preferred embodiments of my invention, it will be understood that changes in construction, combination and arrangement of parts may be made without departing from the spirit and scope of the invention as claimed.

I claim:

A waste heat boiler comprising a casing adapted to have a heating medium flow therethrough, a plurality of independent substantially flat pipe coils positioned within said casing in planes spaced longitudinally of and disposed generally transverse to the direction of flow of said heating medium, an elongated inlet header extending generally parallel to said direction of flow of the heating medium throughout the extent of the coils and having one end of each of said coils connected thereto in a plane of the respective coil, an elongated outlet header coextensive with and juxtaposed to said inlet header and connected in a similar manner to the other end of said coils, said inlet and outlet headers having an inlet and outlet opening, respectively, adjacent a corresponding end of each of said headers for the admission and discharge of a fluid to be heated, a piston type valve slidably disposed within each of said headers, said valves occupying the same relative positions in each of said headers, means operative to effect simultaneous actuation of said valves including valve stems extending from a corresponding end of each of said headers, a yoke interconnecting the distal ends of said stems and a reciprocal fluid pressure operated motor operatively connected to said yoke.

References Cited in the file of this patent

UNITED STATES PATENTS

| Number | Name | Date |
|---|---|---|
| 403,936 | Halsey | May 28, 1889 |
| 1,476,789 | Bassler | Dec. 11, 1923 |
| 1,946,118 | Stockdale et al. | Feb. 6, 1934 |
| 2,035,734 | Williams | Mar. 31, 1936 |
| 2,300,634 | Schoenfeld | Nov. 3, 1942 |